Dec. 13, 1938.    G. F. JOHNSON    2,139,896
METHOD OF AND MEANS FOR LAPPING CONICAL SURFACES
Filed June 3, 1935    2 Sheets-Sheet 1

INVENTOR.
Glen F. Johnson,
BY
ATTORNEYS

Patented Dec. 13, 1938

2,139,896

UNITED STATES PATENT OFFICE 2,139,896

METHOD OF AND MEANS FOR LAPPING CONICAL SURFACES

Glen F. Johnson, Detroit, Mich., assignor, by mesne assignments, to Chrysler Corporation, Highland Park, Mich., a corporation of Delaware Application June 3, 1935, Serial No. 24,670

5 Claims. (Cl. 51—67)

This invention relates to a method of and means for lapping conical surfaces and more particularly internal conical surfaces of annular bearing members.

In the manufacture of roller bearings, and particularly tapered or conical roller bearings, extreme accuracy is required, and the more nearly perfect in smoothness, contour and conical angle, the inside conical surface of the annular cup or ring of such a bearing is formed, the longer the life of the bearing and the more satisfactory will be its functioning in operation. While this has been long realized, the lapping of this inside conical surface to secure such accuracy, has not been practiced by manufacturers of such bearings, due to the great difficulty, with the employment of known methods and appliances, in so lapping such inside conical surface with accuracy and facility, particularly in view of the fact that changes in the adjustment of the apparatus employed, are necessary in lapping the conical surfaces of annular members of different sizes and conical inclination.

The main object of the present invention is to provide suitable method means arranged to operate in accordance with said method, whereby a contact substantially of line form, is secured between an abrading or lapping member and the conical surface of the work and is maintained coincident with a plane of the axis of the work, and with said line conforming in angularity within said plane, to the angularity of said conical surface; and whereby said lapping member and work may be moved relatively in the direction of the length of said line of contact during relative rotation of said member and work, to provide a complete lapping operation and form a perfectly smooth even burnished conical surface of the desired exact conical angle.

It is also an object to provide a machine for accurately positioning and holding the work and lap in the relative positions above set forth and for imparting the described relative rotation and endwise movements to said work and lap; and further, to provide the machine with means for adjusting the lap laterally and reciprocating it longitudinally, together with means for holding it in contact with the conical surface of the work.

It is also an object to provide certain other new and useful features in the construction, arrangement and combination of parts, all as hereinafter more fully set forth, reference being had to the accompanying drawings wherein—

In the several figures of the drawings, a machine is shown for practicing the present method of lapping the conical, inside surface of a member, which, as shown, is a ring or cup member 1 of an ordinary conical bearing, said member being formed with the usual inner tapered or conical surface 2 which in the complete bearing, forms the outer side of the raceway for the conical rolls of the bearing and which conical surface, it is desired to lap to a perfectly smooth, even, burnished surface throughout its entire area and with the exact desired conical taper in the longitudinal direction of the axis of the member. In order to secure these desired results of the lapping operation, it is essential that the lap 3 and work 1 be relatively rotated and be simultaneously and relatively moved in an endwise direction during such rotation, and also that contact of substantially line form between lap and conical surface, be maintained during the lapping operation. Further this line of contact must be maintained coincident throughout its length with a plane of the longitudinal axis of the work so that it will extend straight across the conical surface of the work, as otherwise this surface, due to its conical form, would not be formed perfectly straight in the longitudinal direction of the work axis, and, further this line of contact must conform in its angular relation to the axis of the work, exactly to the angular relation of the conical surface of the work to such axis, in order to give to the finished surface the exact conical angle desired.

Figures 1, 2:
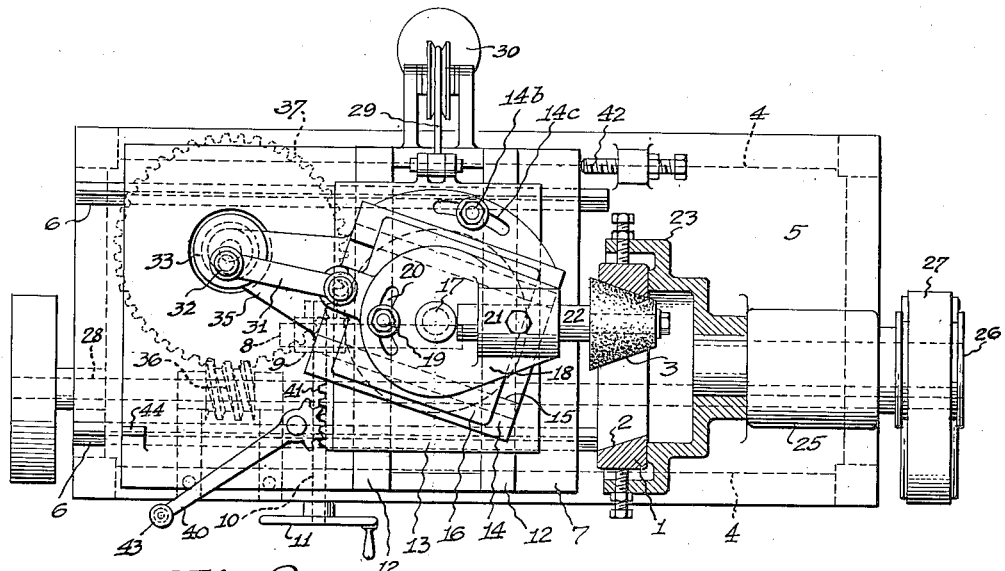
Figure 1 is a side elevation of a machine illustrative of an embodiment of the present invention and method.
Fig. 2 is a plan view of the same with parts in section.
Figures 3, 4:
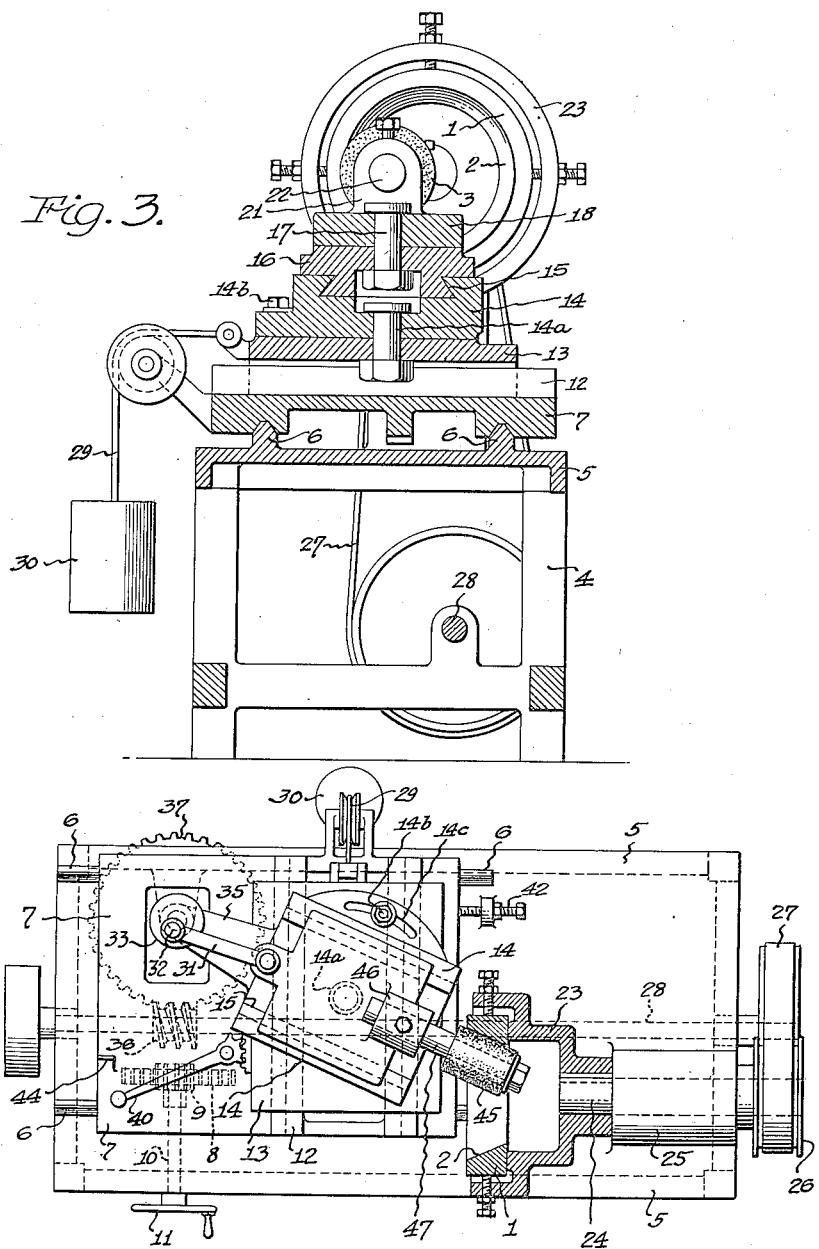
Fig. 3 is a transverse section upon the line 3—3 of Fig. 1.
Fig. 4 is a view similar to Fig. 2, showing a modified construction.

As illustrative of suitable means for holding and operating the work and lapping device in such relative positions, and providing the necessary adjustments to adapt the same for lapping bearing members of different diameters and having conical surfaces of different inclinations, a machine is shown in Figs. 1 to 3 inclusive comprising a suitable supporting frame 4 having a table 5 formed with parallel ways 6 extending longitudinally of the table for guiding a base plate 7 which may be adjusted therealong by providing a rack 8 on the lower side thereof engaged by a pinion 9 on a shaft 10 mounted in bearings on the table and provided at one end with a hand wheel 11 by means of which the shaft may be turned to adjust the base plate longitudinally of the table. On this base plate are transverse upstanding undercut ribs forming a way 12 for guiding a base slide 13 in its movement thereon transversely of the base plate 7 and of the table 5, and mounted upon the slide 13 for rotative adjustment thereon in a horizontal plane, is a block 14 pivotally attached to said slide by a central pivot 14a and locked in adjusted position by a bolt 14b passing through a slot 14c in said block 14 and into a screw-threaded opening in said slide 13, said block 14 being also formed in its upper side with an undercut groove 15 the full length of the block and forming a guide way for a head 16 slidable along said way 15, and pivotally mounted on said head centrally thereof by a vertical pivot bolt 17, is a rotative head 18, said head being adjustably held in the position to which it is turned relative to the head 16 by a clamping bolt 19 passing through an elongated slot 20 in the rotatively adjustable head 18, which slot is curved concentrically with the pivot 17 of the head. This rotatively adjustable head is formed with an upwardly projecting bearing 21 for a horizontally disposed non-rotative shaft 22 adjustably held in said bearing by a set screw and upon the outer projecting end of which shaft the abrading member or lap 3 is rigidly secured in any suitable manner, said lap being thus held in a position to project into the annular bearing member cr cup 1 which is held by a suitable chuck 23, the supporting shaft 24 of which is rotatively mounted in any suitable fixed bearing 25 rising from one end of the table 5. For rotating the shaft 24 and chuck 23 at a comparatively high speed, said shaft is provided with a pulley 26 engaged by a belt 27 running over a second pulley mounted upon a drive shaft 28 extending longitudinally of the frame 4 to the opposite end of machine where it is provided with a drive pulley or other suitable means for driving said shaft.

As shown in Figs. 1, 2 and 3, the lap 3 is shown as being of conical form with its conical surface corresponding in taper to the taper of the conical surface 2 of the work, and the shaft 22 carrying said lap is supported by the head 18 with the axis of said shaft, the axis of the chuck 23, and therefore of the cup 1, in the same horizontal plane. Therefore by moving the base slide 13 upon which the block 14 and heads 16 and 18 are mounted, laterally of or at right angles to the base plate 7, the surface of the conical lap will be brought into line contact with the conical surface 2 of the work and this line contact will be within the horizontal plane of the axis of the work and therefore will extend straight across this conical surface, and to maintain this contact during the lapping operation, the base slide 13 is urged in a direction to move the lap into proper engagement with the work, by securing a cable 29 to one end of said slide 13, passing this cable over a sheave or pulley and attaching a weight 30 to the free end thereof.

To reciprocate the lap 3 endwise during the lapping operation, the head 16 which carries the head 18 and lap mounted thereon, is slidably mounted on the block 14 and guided in such movement in the way 15 in said block; and pivotally attached to the rear end of said head 16 is one end of a link 31, the opposite end of said link being pivotally attached to a pin 32 set eccentrically to the axis of a disk 33, which disk or eccentric is secured upon the upper end of a shaft 34 which in turn is mounted within a bearing on the outer end of an arm 35 rigid with and projecting from the rear end of the block 14. Therefore rotation of said shaft 34 imparts reciprocation to said head 16 by means of said eccentric and link, and said shaft is rotated at a slow speed as compared with the speed of rotation of the work holding chuck 23, by providing a worm 36 on the drive shaft 28 to engage a large worm gear 37 mounted upon a short vertical stub shaft 38 which is connected to the lower end of shaft 34 by a universal shaft section 39 embodying the usual slip joint and universal joints connecting its ends to the stub shafts 34 and 38, this universal connection permitting the arm 35 to swing when the block 14 of which it is a part, is adjustably rotated upon its pivotal connection 14a with the base slide 13. This universal shaft also provides for movement of the base slide 13 by the weight 30 or by a hand lever 40 pivotally carried by the base plate 7 and having a toothed head to engage a rack 41 on the adjacent side edge of said slide 13, and also when said block 14 is rotatively adjusted upon the base slide by loosening the bolt 14b passing through the slot 14c formed in said block and into the base slide 13, which bolt locks said block in adjusted position upon said base slide.

The chuck 23 and work carried thereby is therefore rotated by means of power applied to the drive shaft 28 and the reciprocation of the hone is also caused by power transmitted from said drive shaft by means of the worm 36 on said shaft in engagement with the large worm 37 on the shaft 34. The wheel 37 has what is known as a "hunting" tooth, that is, it is provided with an odd number of teeth so that rotation of the worm 36 and consequent rotation of the chuck, and the rotation of the worm wheel 37 which reciprocates the lapping member will be an unequal differential movement. Therefore the path of movement of the lapping member in contact with the surface of the work will be varied. In other words the rotations of the work will not be an exact multiple of the reciprocations of the lapping member and there will be an overlapping of the paths of travel of the member in contact with the surface of the work so that ridges which would otherwise appear on the surface of the work due to the lapping member following the same path during succeeding rotations of the work, will be eliminated.

Because of the conical taper of the surface 2 to be lapped, the contact of the lap with such surface must conform to the surface and be a substantially line contact, and this contact extends throughout its length, coincident with an axial plane of the work, so that said contact will extend straight across said surface, and the endwise movement of the lap must correspond exactly in direction, with the taper of the conical surface so that the lap will not withdraw from or approach said surface in its reciprocation but will move exactly parallel therewith. Therefore the block 14 upon which the head 16 slides, must be set at an angle to the axis of the chuck corresponding to the conical angle of the surface 2 of the work and to so set said block it is attached to the base slide by the vertical pivot 14a and then held in adjusted position by the clamping bolt 14b; and when work having a surface of a different conical inclination is to be lapped, not only the block must be so adjusted, but the head 18 carrying the lap must be correspondingly rotatively adjusted as well, by loosening the holding screw 19 and rotating said head to bring the contact side of the lap into correspondence with the direction of sliding movement of the head 16 and to conform exactly with said conical surface to be lapped.

To withdraw the lap endwise from within the annular work or bearing cup 1, the base plate 7 may be moved endwise by means of the hand wheel 11, an adjustable stop 42 being provided on the table 5 to limit movement toward the chuck 23, and the base slide 13 may be moved against the action of the weight 30 and held in that position by the hand lever 40, said lever being provided with a latch pin 43 to engage over a lug 44 on the base plate and hold said slide in mid position with the lap 3 centrally positioned in the cup ring 1 and out of contact therewith.

In Fig. 4 of the drawings, a construction is shown wherein the arrangement of parts is modified to provide for the use of a cylindrical lap 45 instead of one of conical form, the construction of the machine being substantially the same as in Figs. 1 to 3 except that the rotative head 18 carrying the lap is dispensed with and the bearing 46 to receive the shaft 47 for the lap is formed upon the sliding head 16, the chuck 23 being set off further, laterally of the table 5 and said sliding head, to bring the path of said head into parallelism with the conical surface of the work so that the cylindrical surface of the lap 45 will have line contact with said conical surface and extend straight across the same in the horizontal plane of the axis of the chuck and work, said block 14 being rotatively adjustable to change the angle of reciprocation of said lap to conform to change in conical angle of the surface to be lapped.

Obviously other changes may be made in the machine for practicing the present lapping method, without departing from the spirit of the invention and such changes are contemplated.

What I claim is:—

1. The method of lapping the internal conical surface of an annular bearing member, which method consists in applying a non-rotatable lapping member to the conical surface to be lapped with a substantially line contact between member and surface throughout the width of said surface and with said line lying wholly within a plane of the longitudinal axis of said annular member and extending in said plane at an angle to said axis equal to the conical angle of said surface; rotating said annular member; and moving said lapping member, in the direction of the length of said line of contact with a varying speed of reciprocation.

2. In a machine for the purpose described, the combination of a chuck for holding an annular bearing member having an inner conical surface, means for non-rotatively supporting a lapping member in line contact at one side only with said surface throughout the width thereof with said line extending throughout its length in the axial plane of said annular member and at an angle to the longitudinal axis thereof, said angle being the same as the conical angle of said surface, said supporting means including a slide and a reciprocable member upon which said lapping member is mounted, means for rotating said chuck at high speed, and means for reciprocating said slide simultaneously with the rotation of said chuck and at a speed varying throughout the length of its reciprocation to move said lapping member endwise in contact with said conical surface and vary its path of travel in contact with said surface.

3. In a machine as characterized in claim 2 and wherein said slide upon which said lapping member is mounted, is mounted for rotative adjustment upon an upwardly extending axis to adjust said lapping member to the conical surface of said annular member and said means for reciprocating said slide includes an eccentric operative to vary the speed of reciprocation.

4. In a machine for the purpose described, and as characterized in claim 2, and wherein said supporting means for said lapping member includes means for adjusting said supporting means toward said chuck, means for adjusting said supporting means transversely of said last named means to adjust said lapping member laterally within said annular member into contact with said conical surface of said annular member, and means including a weight member for urging said lapping member laterally toward said conical surface.

5. In a machine for the purpose described, the combination of a table, a base plate guided for sliding movement on said table longitudinally thereof, a base slide mounted on said base plate for movement transversely thereof, a block mounted upon said base slide for rotative adjustment up an upwardly extending axis, said block being formed with a longitudinal way, a sliding head movable in said way, means on said sliding head projecting therefrom, a lapping member mounted upon the projecting end of said last named means, a chuck for holding an annular bearing member having an inside conical surface, means on one end of said table for supporting said chuck with said lapping member projecting into the annular member carried by said chuck and in a position to contact the conical surface of said annular member along a line lying wholly within the axial plane of said chuck and annular member, weight means for urging said base slide transversely of said table to hold said lapping member in contact with said conical surface, means for reciprocating said sliding head, and means for rotating said chuck simultaneously with said reciprocation of said head.

GLEN F. JOHNSON.